United States Patent
Tang et al.

(10) Patent No.: US 11,287,301 B2
(45) Date of Patent: Mar. 29, 2022

(54) CONTAINER DISTURBANCE FILTERING FOR CAPACITIVE LIQUID LEVEL SENSING

(71) Applicant: TEXAS INSTRUMENTS INCORPORATED, Dallas, TX (US)

(72) Inventors: Haozhe Tang, Shanghai (CN); Yang Li, Shanghai (CN); Songhua Hu, Shanghai (CN)

(73) Assignee: Texas Instruments Incorporated, Dallas, TX (US)

(*) Notice: Subject to any disclaimer, the term of this patent is extended or adjusted under 35 U.S.C. 154(b) by 38 days.

(21) Appl. No.: 16/750,207

(22) Filed: Jan. 23, 2020

(65) Prior Publication Data

US 2021/0063226 A1    Mar. 4, 2021

Related U.S. Application Data

(63) Continuation of application No. PCT/CN2019/103940, filed on Sep. 2, 2019.

(51) Int. Cl.
*G01F 23/26* (2006.01)
*G01F 23/263* (2022.01)

(52) U.S. Cl.
CPC .......... *G01F 23/265* (2013.01); *G01F 23/266* (2013.01); *G01F 23/268* (2013.01)

(58) Field of Classification Search
CPC .............................................. G01F 23/26–268
See application file for complete search history.

(56) References Cited

U.S. PATENT DOCUMENTS

| 9,395,716 B2 * | 7/2016 | Bammer ................. A61M 5/24 |
| 2017/0120616 A1 | 5/2017 | Michallon |
| 2020/0333175 A1* | 10/2020 | Huang .................. G01F 23/266 |

FOREIGN PATENT DOCUMENTS

| CN | 102589644 A | 7/2012 |
| CN | 104535135 A | 4/2015 |
| CN | 109238400 A | 1/2019 |
| JP | 2019095392 A | 6/2019 |

* cited by examiner

*Primary Examiner* — Justin N Olamit
(74) *Attorney, Agent, or Firm* — Brian D. Graham; Charles A. Brill; Frank D. Cimino

(57) ABSTRACT

An apparatus for filtering touches and disturbances of a container comprises a processing unit (PU) and computer-readable storage devices storing machine instructions. The PU obtains and sums together sensor values for a first sampling time from electrodes affixed to the container. The PU determines a difference between the sum for the first sampling time and a sum for a second sampling time, which is compared to a threshold representative of a change in capacitance due to a touch on the container. The PU determines whether the touch on the container has occurred at the first sampling time based on the comparison. If a touch occurred, the PU continues to obtain additional sensor values for additional sampling times and determine whether a touch on the container has occurred at the additional sampling times, until determining no touch occurred. The PU determines liquid level for the container after determining no touch occurred.

20 Claims, 4 Drawing Sheets

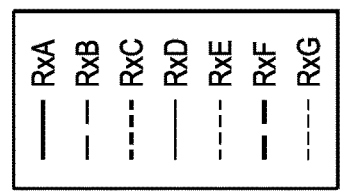
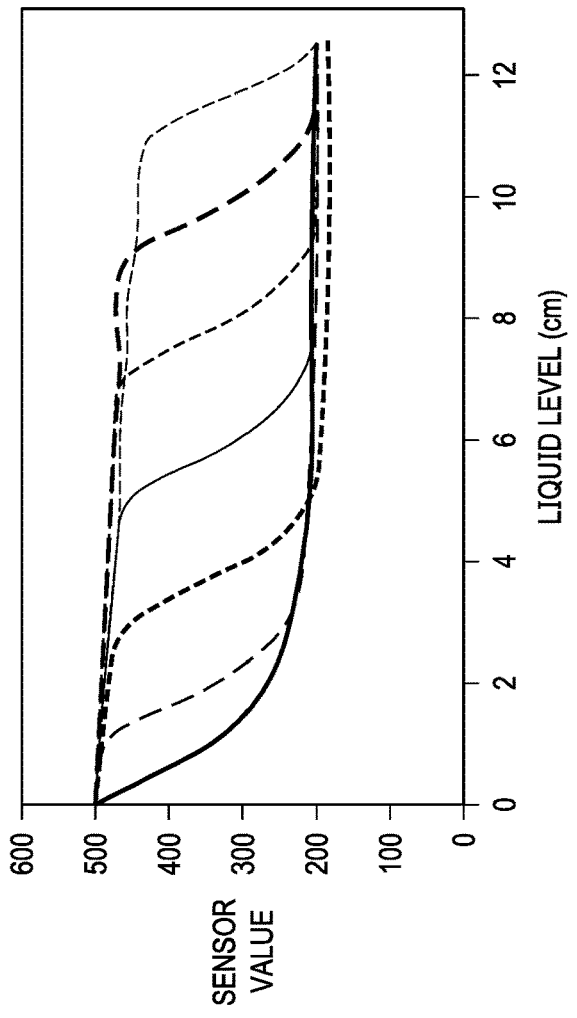
FIG. 3
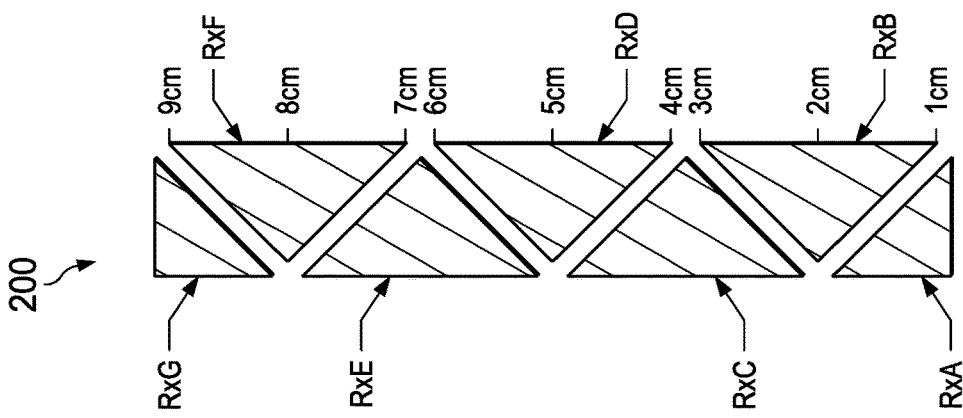
FIG. 2

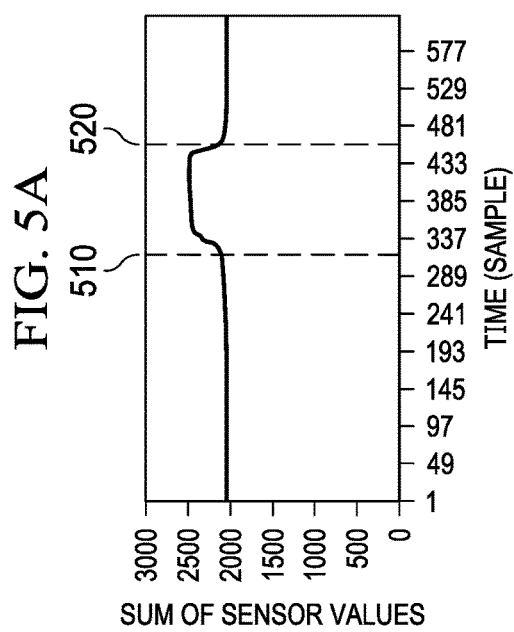
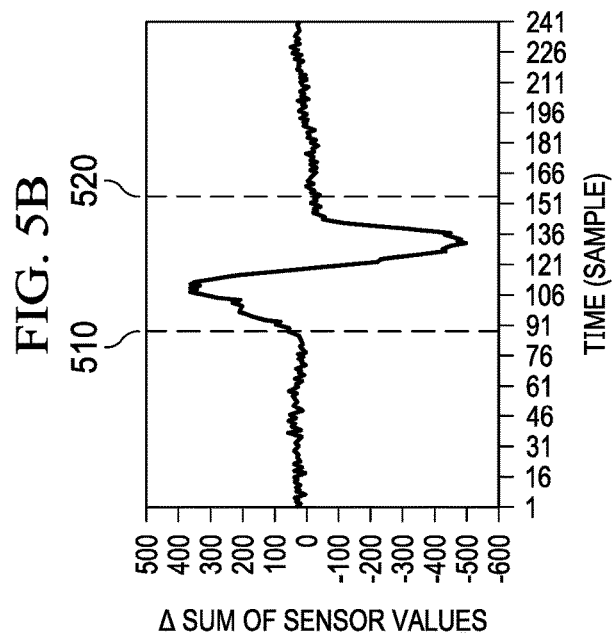
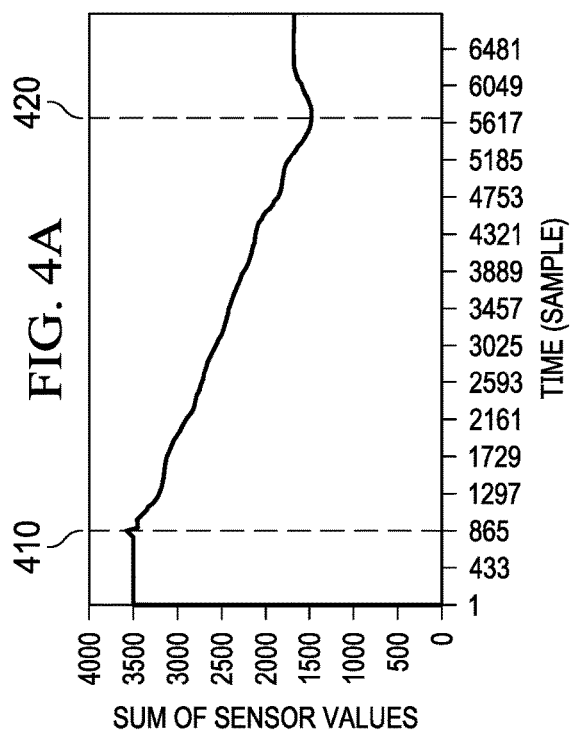
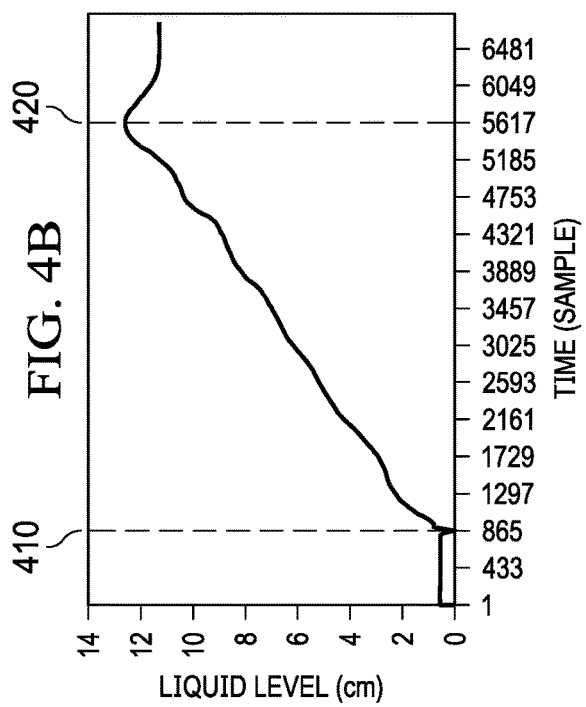

CONTAINER DISTURBANCE FILTERING FOR CAPACITIVE LIQUID LEVEL SENSING

BACKGROUND

Capacitive sensing for determining liquid levels within containers can be based on projected capacitance in which a transmitter capacitive sensor projects an electric sensing field into a container, through liquid or aft depending on the liquid level, Liquid level can be determined by measuring the capacitance between a receiver electrode and a ground terminal or between the receiver electrode and another electrode, the two electrodes forming a capacitive sensor. The measured capacitance is a function of the dielectric constants for liquid and air and a proportion of the receiver electrode exposed to each. Thus, the measured capacitance is proportional to the liquid level within the container.

Because the capacitive sensors need not be in contact with the liquid in the container, a capacitive liquid level measurement system can be used for medical and personal use applications, such as the water tank for a coffee machine or a catheter bag. Similarly, a capacitive liquid level measurement system can be used in industrial applications for corrosive liquids and other chemical agents. However, capacitive liquid level measurement systems are susceptible to noise introduced in the capacitive measurements from perturbations of associated containers, such as a hand touching the container. In manufacturing and other applications requiring a high degree of accuracy in the determined liquid level, the change in capacitance due to touches on the container can cause unacceptable error in the liquid level determinations.

SUMMARY

An apparatus comprises one or more processing unit (PU) cores and one or more non-transitory computer-readable storage devices storing machine instructions. The machine instructions, when executed by the one or more PU cores, cause the one or more PU cores to obtain sensor values for a first sampling time from a set of electrodes affixed to a container. Each sensor value corresponds to a respective capacitance. The PU cores sum the sensor values together to obtain a sum for the first sampling time, and determine a difference between the sum for the first sampling time and a sum for a second sampling time. The PU cores compare the difference to a threshold representative of a change in capacitance due to a touch on the container, and determine whether a touch on the container has occurred at the first sampling time based on the comparison. In response to determining no touch on the container occurred at the first sampling time, the PU cores determine a liquid level for the container at the first sampling time.

In response to determining that a touch on the container occurred at the first sampling time, the PU cores obtain additional sensor values for an additional sampling time from the set of electrodes and sum the sensor values together to obtain a sum for the additional sampling time. The PU cores determine a difference between the sum for the additional sampling time and the sum for the first sampling time. The PU cores compare the difference to the threshold and determine whether a touch on the container has occurred at the additional sampling time. In response to determining that no touch on the container occurred at the additional sampling time, the PU cores determine a liquid level for the container at the additional sampling time.

In some implementations, the apparatus comprises the set of electrodes affixed to an exterior wall of the container. The set of electrodes comprise a transmitter electrode configured to project an electric field into the container and a plurality of receiver electrodes configured to measure a capacitance based on the projected electric field. The plurality of receiver electrodes is arranged in an overlapping layout, such that a liquid level for the container influences multiple receiver electrodes at a time. Each receiver electrode is triangular shaped, in some implementations.

In some implementations, a first sensor value for a particular electrode corresponds to a first capacitance and the particular electrode being higher than a liquid level for the container, and a second sensor value for the particular electrode corresponds to a second capacitance and the particular electrode being lower than the liquid level for the container. A range of sensor values between the first sensor value and the second sensor value is indicative of a portion of the particular electrode being higher than the liquid level for the container and a portion of the particular electrode being lower than the liquid level for the container. The PU cores determine the liquid level for the container by comparing each sensor value to a reference capacitance and interpolating the liquid level for the container based on the comparisons.

BRIEF DESCRIPTION OF THE DRAWINGS

For a detailed description of various examples, reference will now be made to the accompanying drawings in which:

FIG. 2 illustrates an example layout of receiver electrodes in an example capacitive liquid level measurement system.

FIG. 3 shows a graph showing the relationship between sensor values for electrodes in an example capacitive liquid level measurement system and a liquid level in a container associated with the measurement system.

FIGS. 4A-B show graphs of a liquid level in a container associated with a liquid level measurement system and a sum of sensor values for electrodes in the measurement system over time, as liquid is poured into the container at a constant rate.

FIGS. 5A-B show graphs of a sum of sensor values and a change in the sum of sensor values for electrodes in a liquid level measurement system in response to a touch on a container associated with the liquid level measurement system.

DETAILED DESCRIPTION

Figure 1:
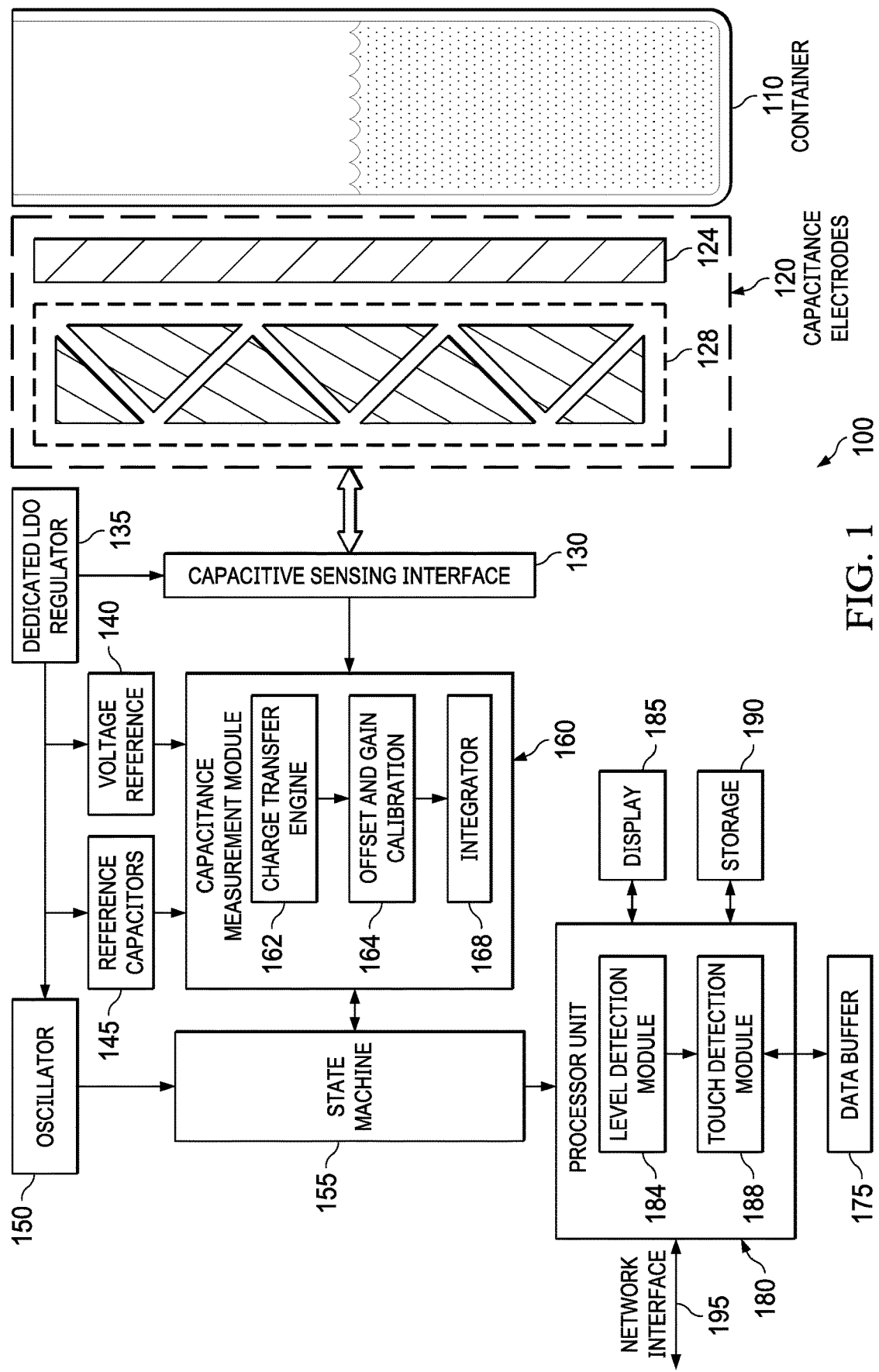
FIG. 1 illustrates an example capacitive liquid level measurement system.

The disclosed capacitive liquid level measurement systems filter out changes in measured capacitance due to touches on the associated containers, preserving the accuracy of the determined liquid levels. The disclosed capacitive liquid level measurement systems also include overlapping receiver electrodes, such that liquids within containers influence multiple receiver electrodes at a time. This allows the liquid level measurement systems to determine liquid levels within containers more accurately than some ultrasonic measurement systems and some capacitive liquid level measurement systems without overlapping receiver electrodes.

A capacitive liquid level measurement system includes capacitance electrodes, a processing unit, storage, and a display. The term "processing unit" (singular) is used herein to refer to either a single or multiple processing units, and to broadly described central processing units, digital signal processors, application specific integrated circuits, and the like. The capacitance electrodes are affixed to an exterior wall of a container, and are configured to project an electric field into the container and measure a capacitance based on the projected electric field.

The processing unit receives the sensor values for a first sampling time for each electrode in the capacitance electrodes and stores them in the storage as appropriate. The processing unit sums the sensor values for the first sampling time together and determines a difference between the sum for the first sampling time and a sum of sensor values for a second, earlier sampling time. The processing unit compares the difference between the two sums to a threshold representing a change in capacitance due to a touch on the container. The processing unit then determines whether a touch on the container occurred at the first sampling time based on the comparison.

In some examples, the capacitance electrodes include a transmitter electrode and a plurality of receiver electrodes. The receiver electrodes can be arranged at overlapping heights, such that a liquid level for the container influences the capacitances measured at multiple receiver electrodes at a time. The overlapping layout can enable the processing unit to determine a liquid level for the container with more accuracy by comparing the sensor values from multiple receiver electrodes to each other and to a reference capacitance, and interpolating the liquid level from the comparisons. In some implementations, the receiver electrodes are triangular shaped.

In some examples, the processing unit determines the liquid level for the container at the first sampling time in response to a determination that no touch on the container occurred at the first sampling time. In response to determining that a touch on the container occurred at the first sampling time, the processing unit obtains additional sensor values for an additional sampling time from the capacitance electrodes and determines whether a touch occurred at the additional sampling time, until the processing unit determines no touch on the container occurred at the additional sampling time. In response to determining no touch on the container occurred at the additional sampling time, the processing unit determines the liquid level for the container at the additional sampling time.

FIG. 1 illustrates an example capacitive liquid level measurement system 100 with a container 110. Liquid level measurement system 100 includes capacitance electrodes 120, which are fastened to the exterior side wall of container 110. Container 110 can include any non-conductive material, such as plastic or glass. Capacitance electrodes 120 includes transmitter electrode 124 and a set of receiver electrodes 128. Electrodes 120 are coupled to capacitive sensing interface 130, which prompts transmitter electrode 124 to project an electric field. Low dropout (LDO) voltage regulator 135, voltage reference 140, reference capacitors 145, oscillator 150, and state machine 155 work in conjunction with capacitance measurement module 160 and interface 130 to cause transmitter electrode 124 to project an electric field.

Capacitive sensing interface 130 also receives a sensor value for each receiver electrode in receiver electrodes 128, representing the electric field for the receiver electrode. The measured electric field is provided to capacitance measurement module 160, which converts the measurement of the electric field to a capacitance and compares the determined capacitance to a reference capacitance, such as from reference capacitors 145. Capacitance measurement module 160 includes charge transfer engine 162, offset and gain calibration module 164, and integrator 166. Charge transfer engine 162 performs analog to digital conversion, converting the sensor capacitance measurements into digital data, such as with a sigma delta converter. Offset and gain calibration module 164 corrects for parasitic capacitance and removes gain mismatch, both of which can result from external circuitry. Integrator 166 measures relative changes in capacitance. The relative changes in capacitance are provided to processor unit 180.

Processor unit 180 includes a level detection module 184 and a touch detection module 188. Storage 190 can be used to store instructions and data received from capacitance measurement module 160, and may be any appropriate non-transitory storage medium, such as a static random access memory (SRAM).

Level detection module 184 receives the capacitance for each electrode in receiver electrodes 128 and determines a liquid level in container 110 based on the capacitances. For example, level detection module 184 compares the measured capacitance for each electrode to a reference capacitance. The reference capacitance can be a capacitance for the electrode while the electrode is above the liquid level in container 110, a capacitance for the electrode while the electrode is below the liquid level in container 110, or both. Level detection module 184 then interpolates the liquid level for the container based on the comparisons. The determined liquid level can be displayed on display 185 or provided to other systems via a network interface 195. Network 195 may include various combinations of local area networks (LANs), wide area networks (WANs), the internet and/or other known or later developed wired or wireless communication mechanism, for example.

Touch detection module 188 receives the capacitance for each electrode in receiver electrodes 128 and determines if a change in capacitance is due to a touch on container 110. Touch detection module 188 stores and receives data from data buffer 175, such as previously sampled capacitances for each electrode. If touch detection module 188 determines a change in capacitance is due to a touch on container 110, it can display a notification indicating the touch on container 110 on display 185 or provide the notification to other systems via network interface 195.

The other systems receiving the determined liquid level from level detection module 184 and notification from touch detection module 188 can adjust operation based on the determined liquid level, or avoid adjustment in response to the notification from touch detection module 188 indicating the change in capacitance is due to a touch on container 110. In some examples, touch detection module 188 provides the notification to level detection module 184, which waits to determine the liquid level in container 110 until touch detection module 188 indicates no touch is on container 110.

FIG. 2 illustrates an example layout 200 of receiver electrodes in an example capacitive liquid level measurement system. Layout 200 includes seven receiver electrodes, RxA through RxG, but any appropriate number of receiver electrodes can be used depending on the particular implementation. Each receiver electrode RxA through RxG is triangular shaped and overlaps with at least one other receiver electrode. Because liquid within a container associated with the liquid level measurement system disturbs the electric field propagation between the electrodes and reduces the capacitance, the capacitance between a transmitter electrode and the receiver electrodes RxA through RxG in layout 200 is influenced by the level of liquid within the container.

The liquid level measurement system compares the capacitance measured at each receiver electrode to a reference capacitance, and determines a change in capacitance due to the liquid within the container. The triangular shape and overlapping layout 200 of receiver electrodes RxA through RxG causes the liquid to influence the capacitance of multiple receiver electrodes at a time, which allows the liquid level measurement system to more accurately determine the liquid level within the container. Although FIG. 2 shows triangular shaped receiver electrodes, any appropriate shape can be used, depending on the particular implementation.

FIG. 3 illustrates a graph showing the relationship between sensor values for receiver electrodes RxA through RxG in example layout 200 shown in FIG. 2 and an amount of liquid in a container associated with an example capacitive liquid level measurement system including receiver electrodes in layout 200. The sensor values represent capacitance, and the capacitance for each receiver electrode decreases as the liquid level within the container rises above its height within layout 200. The capacitance for receiver electrodes in layout 200 decreases sequentially as the liquid level increases—RxA decreases first, then RxB, and so on through RxG at the top of layout 200. The level of liquid within the container can be determined based on the known height of receiver electrodes in layout 200 against the side of the container and which receiver electrodes experience a decrease in capacitance due to the presence of liquid within the container.

As FIGS. 4A-B illustrate, the total measured capacitance changes substantially linearly with liquid level in a container associated with an example capacitive liquid level measurement system, for example linearly decreasing as liquid level increases. FIG. 4A shows the sum of sensor values for electrodes in capacitive liquid level measurement system 100 shown in FIG. 1 over time, as liquid is poured into the container at a constant rate. FIG. 4B shows the liquid level in container 110 over time, as liquid is poured into the container at a constant rate. At time 410, the liquid level is at or near zero and the sum of sensor values is at a maximum. At time 420, the liquid level is more than twelve centimeters high in container 110, and the sum of sensor values is at a minimum. Between time 410 and time 420, the sum of sensor values decreases linearly, and the liquid level increases linearly.

Thus, the capacitance of electrodes 120 can be used to determine the amount of liquid within container 110, such as a height of the liquid within container 110. In some implementations, the slope of the linear relationship between the sum of sensor values and liquid level depends on the type of liquid in container 110. Processor unit 180 calculates the slope of the linear relationship and determines what liquid is in container 110 based on the calculated slope.

FIGS. 5A-B illustrate the impact of a touch on container 110 on the sum and the change in the sum of sensor values for electrodes 120 in example liquid level measurement system 100 shown in FIG. 1. FIG. 5A shows the sum of sensor values for electrodes 120 in capacitive liquid level measurement system 100 shown in FIG. 1 over time. FIG. 5B shows the change in the sum of sensor values 120, ΔSum, over time. Prior to time 510, the sum of sensor values for electrodes 120 is relatively constant, and ΔSum is relatively low, indicating the liquid level within container 110 is unchanged. At time 510, a hand touches container 110, causing a change in capacitance for electrodes 120 and by extension the sum of sensor values and ΔSum. At time 520, the hand releases container 110, causing the capacitance for electrodes 120, the sum of sensor values, and ΔSum to return to their values from prior to time 510.

In FIG. 5A, the sum of sensor values between time 510 and time 520 is greater than prior to time 510 or after time 520, indicating the hand touch causes an increase in capacitance for electrodes 120. In FIG. 5B, ΔSum is relatively low and constant prior to time 510 and after time 520. Between time 510 and time 520, ΔSum changes drastically, increasing and decreasing sharply. If liquid level measurement system 100 mistakes the increased capacitance and changes in the sum of sensor values due to the touch for a change in liquid level in container 110, it provides incorrect information regarding the liquid level in container 110 to display 185 and other systems via network interface 195.

Figure 6:
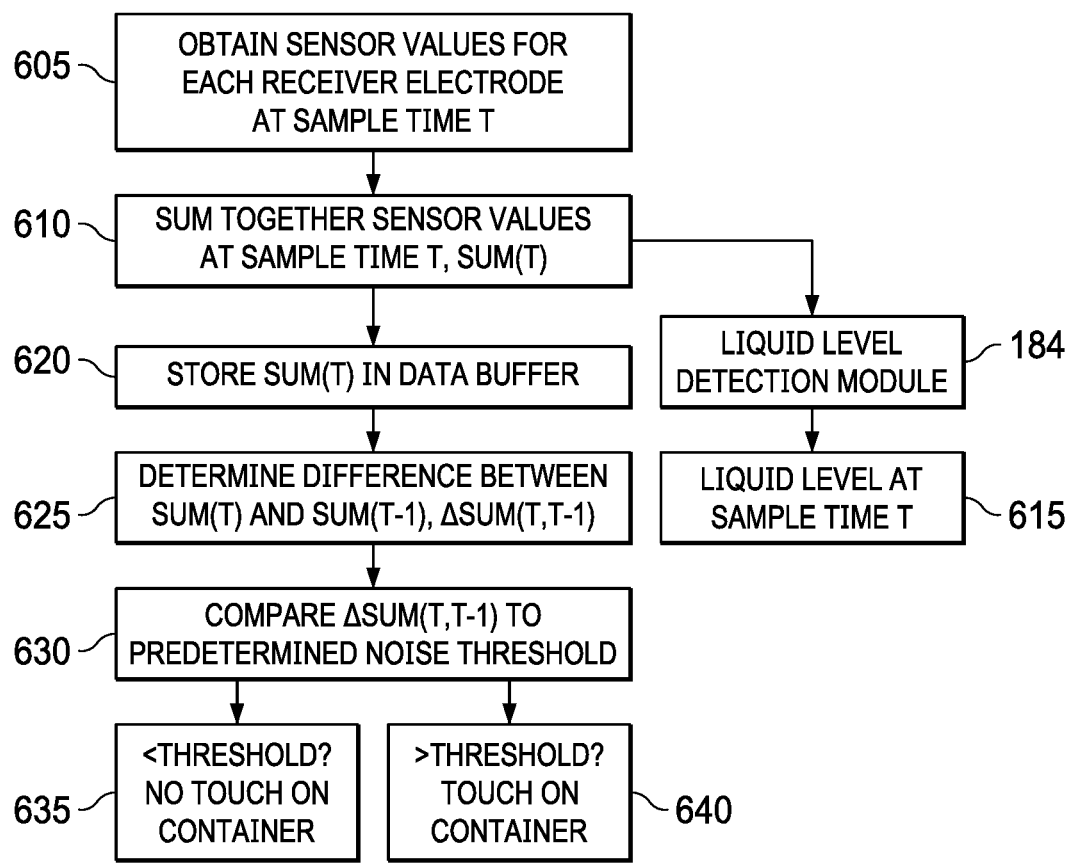
FIG. 6 shows, in flowchart form, an example process for detecting a touch on a container associated with a liquid level measurement system and determining a liquid level in the container.

FIG. 6 shows, in flow chart form, an example process 600 for detecting a touch on container associated with a capacitive liquid level measurement system, such as container 110 and example capacitive liquid level measurement system 100 shown in FIG. 1. Process 600 is performed by a processing unit executing instructions stored in a non-transitory computer readable medium, such as PU 180 executing instructions stored in storage 190 from capacitive liquid level measurement system 100. The flow chart begins at operation 605, during which the sensor values for each receiver electrode in the liquid level measurement system at a particular sample time T is obtained. At operation 610, the sensor values are summed together and represented as Sum(T). In some liquid level measurement systems, Sum(T) is provided to a liquid level detection module, such as liquid level detection module 184 in liquid level measurement system 100, which outputs a liquid level within the container at the particular sample time T at optional operation 615. In some embodiments, liquid level detection module 184 waits to perform optional operation 615 and determine a liquid level within the container at the particular sample time T until PU 180 determines no touch occurred on the container at time T.

At operation 620, Sum(T) is stored in a buffer, such as data buffer 175 in liquid level measurement system 100. The data buffer stores a number of sums of sensor values determined from prior samples of the receiver electrodes. The number of historical sums N stored in the data buffer can be chosen based on the sampling frequency of the liquid level measurement system. At operation 625, a difference between the current sum of sensor values Sum(T) and the previous sum of sensor values Sum(T−1) is determined and represented as ΔSum(T, T−1). In other processes, the difference is determined between the current sum and any other prior sum, such as the sum four samples prior to the current sum, Sum(T−4). The prior sum can be chosen based on the sampling frequency of the liquid level measurement system.

At operation 630, ΔSum(T, T−1) is compared to a predetermined noise threshold. The predetermined noise threshold is chosen based on the noise sensitivity of the particular implementation. For example, the predetermined noise threshold represents the ΔSum due to a touch on the container. Operation 635 is performed in response to ΔSum(T, T−1) being less than the predetermined noise threshold, and the liquid level measurement system determines no touch on the container has occurred. Operation 640 is performed in response to ΔSum(T, T−1) being greater than the predetermined noise threshold, and the liquid level measurement system determines a touch on the container has occurred. In some processes, the liquid level measurement system determines a particular number of differences are less than or greater than the predetermined noise threshold before determining whether a touch on the container has occurred.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A non-transitory computer-readable storage device storing machine instructions which, when executed by one or more processing unit (PU) cores, cause the one or more PU cores to:
    obtain sensor values for a first sampling time from a set of electrodes affixed to a container, wherein each of the sensor values corresponds to a respective capacitance;
    sum the sensor values together to obtain a sum for the first sampling time;
    determine a difference between the sum for the first sampling time and a sum for a second sampling time;
    compare the difference to a threshold, wherein the threshold is representative of a change in capacitance due to a touch on the container;
    determine whether the touch on the container has occurred at the first sampling time based on the comparison; and
    determine a liquid level for the container at the first sampling time in response to a determination that no touch on the container occurred at the first sampling time.

2. The non-transitory computer-readable storage device of claim 1, wherein the set of electrodes comprises a transmitter electrode configured to project an electric field into the container and a plurality of receiver electrodes configured to measure a capacitance based on the projected electric field.

3. The non-transitory computer-readable storage device of claim 2, wherein the plurality of receiver electrodes is arranged in an overlapping layout, such that a liquid level for the container influences multiple receiver electrodes at a time.

4. The non-transitory computer-readable storage device of claim 1, wherein the machine instructions to determine the liquid level for the container at the first sampling time further comprise machine instructions which, when executed by the one or more PU cores, cause the one or more PU cores to:
    compare each of the sensor values to a reference capacitance; and
    interpolate the liquid level for the container at the first sampling time based on the comparison of each of the sensor values to the reference capacitance.

5. The non-transitory computer-readable storage device of claim 1, wherein a first sensor value for a particular electrode corresponds to a first capacitance and the particular electrode being higher than a liquid level for the container, and wherein a second sensor value for the particular electrode corresponds to a second capacitance and the particular electrode being lower than the liquid level for the container.

6. The non-transitory computer-readable storage device of claim 5, wherein a range of sensor values between the first sensor value and the second sensor value is indicative of a portion of the particular electrode being higher than the liquid level for the container and a portion of the particular electrode being lower than the liquid level for the container.

7. The non-transitory computer-readable storage device of claim 1, wherein the difference between the sum for the first sampling time and the sum for the second sampling time is a first difference, and wherein the non-transitory computer-readable storage device further comprises machine instructions which, when executed by the one or more PU cores, cause the one or more PU cores to:
    obtain additional sensor values for an additional sampling time from the set of electrodes;
    sum the additional sensor values together to obtain a sum for the additional sampling time;
    determine a second difference between the sum for the additional sampling time and the sum for the first sampling time;
    compare the second difference to the threshold;
    determine whether the touch on the container has occurred at the additional sampling time based on the comparison of the second difference to the threshold; and
    determine a liquid level for the container at the additional sampling time in response to a determination that no touch on the container occurred at the additional sampling time.

8. An apparatus, comprising:
    one or more processing unit (PU) cores; and
    one or more non-transitory computer-readable storage devices storing machine instructions which, when executed by the one or more PU cores, cause the one or more PU cores to:
    obtain sensor values for a first sampling time from a set of electrodes affixed to a container, wherein each of the sensor values corresponds to a respective capacitance;
    sum the sensor values together to obtain a sum for the first sampling time;
    determine a difference between the sum for the first sampling time and a sum for a second sampling time;
    compare the difference to a threshold, wherein the threshold is representative of a change in capacitance due to a touch on the container;
    determine whether the touch on the container has occurred at the first sampling time based on the comparison; and
    determine a liquid level for the container at the first sampling time in response to a determination that no touch on the container occurred at the first sampling time.

9. The apparatus of claim 8, further comprising the set of electrodes affixed to an exterior wall of the container, wherein the set of electrodes comprises a transmitter electrode configured to project an electric field into the container and a plurality of receiver electrodes configured to measure a capacitance based on the projected electric field.

10. The apparatus of claim 9, wherein the plurality of receiver electrodes is arranged in an overlapping layout, such that a liquid level for the container influences multiple receiver electrodes at a time.

11. The apparatus of claim 10, wherein each receiver electrode in the plurality of receiver electrodes is triangular shaped.

12. The apparatus of claim 8, wherein a first sensor value for a particular electrode corresponds to a first capacitance and the particular electrode being higher than a liquid level for the container, and wherein a second sensor value for the particular electrode corresponds to a second capacitance and the particular electrode being lower than the liquid level for the container.

13. The apparatus of claim 12, wherein a range of sensor values between the first sensor value and the second sensor value is indicative of a portion of the particular electrode being higher than the liquid level for the container and a portion of the particular electrode being lower than the liquid level for the container.

14. The apparatus of claim 8, wherein the machine instructions to determine the liquid level for the container at the first sampling time further comprise machine instructions which, when executed by the one or more PU cores, cause the one or more PU cores to:
compare each of the sensor values to a reference capacitance; and
interpolate the liquid level for the container at the first sampling time based on the comparison of each of the sensor values to the reference capacitance.

15. The apparatus of claim 8, wherein the difference between the sum for the first sampling time and the sum for the second sampling time is a first difference, and wherein the apparatus further comprises machine instructions which, when executed by the one or more PU cores, cause the one or more PU cores to:
obtain additional sensor values for an additional sampling time from the set of electrodes;
sum the additional sensor values together to obtain a sum for the additional sampling time;
determine a second difference between the sum for the additional sampling time and the sum for the first sampling time;
compare the second difference to the threshold;
determine whether a touch on the container has occurred at the additional sampling time based on the comparison between the second difference and the threshold; and
determine a liquid level for the container at the additional sampling time in response to a determination that no touch on the container occurred at the additional sampling time.

16. A method for determining a touch on a container using a capacitive sensor, comprising:
obtaining sensor values for a first sampling time from the capacitive sensor affixed to the container, wherein each of the sensor values corresponds to a respective capacitance, and wherein the capacitive sensor comprises a set of electrodes;
summing the sensor values together to obtain a sum for the first sampling time;
determining a difference between the sum for the first sampling time and a sum for a second sampling time;
comparing the difference to a threshold, wherein the threshold is representative of a change in capacitance due to the touch on the container;
determining whether the touch on the container has occurred at the first sampling time based on the comparison; and
determining a liquid level for the container at the first sampling time in response to a determination that no touch on the container occurred at the first sampling time.

17. The method of claim 16, wherein determining the liquid level for the container at the first sampling time comprises:
comparing each sensor value to a reference capacitance; and
interpolating the liquid level for the container at the first sampling time based on the comparison of each of the sensor values to the reference capacitance.

18. The method of claim 16, wherein a first sensor value for a particular electrode corresponds to a first capacitance and the particular electrode being higher than a liquid level for the container, and wherein a second sensor value for the particular electrode corresponds to a second capacitance and the particular electrode being lower than a liquid level for the container.

19. The method of claim 18, wherein a range of sensor values between the first sensor value and the second sensor value is indicative of a portion of the particular electrode being higher than the liquid level for the container and a portion of the particular electrode being lower than the liquid level for the container.

20. The method of claim 16, wherein the difference between the sum for the first sampling time and the sum for the second sampling time is a first difference, and wherein the method further comprises:
obtaining additional sensor values for an additional sampling time from the set of electrodes;
summing the additional sensor values together to obtain a sum for the additional sampling time;
determining a second difference between the sum for the additional sampling time and the sum for the first sampling time;
comparing the second difference to the threshold;
determining whether a touch on the container has occurred at the additional sampling time based on the comparison between the second difference and the threshold; and
determining a liquid level for the container at the additional sampling time in response to a determination that no touch on the container occurred at the additional sampling time.

* * * * *